United States Patent
Towers et al.

[19]

[11] Patent Number: 6,038,857

[45] Date of Patent: Mar. 21, 2000

[54] CONTROL APPARATUS FOR A BRAKE BOOSTER

[75] Inventors: Kenneth Scott Towers, Granger; Richard Becker McClain, South Bend, both of Ind.; John e. Mackiewicz, Niles, Mich.

[73] Assignee: Robert Bosch Technology Corporation, Broadview, Ill.

[21] Appl. No.: 09/097,778

[22] Filed: Jun. 15, 1998

[51] Int. Cl.[7] ..................................................... F16D 31/02
[52] U.S. Cl. ................................................. 60/422; 91/434
[58] Field of Search ............................ 60/582, 402, 405, 60/422, 385; 91/28, 514, 32, 434, 516

[56] References Cited

U.S. PATENT DOCUMENTS

| | | | |
|---|---|---|---|
| 3,967,536 | 7/1976 | Banch | 91/28 |
| 5,960,629 | 10/1999 | McClain et al. | 60/581 |

*Primary Examiner*—Edward K. Look
*Assistant Examiner*—Hermes Rodriguez
*Attorney, Agent, or Firm*—Leo H McCormick, Jr.; Warren Comstock

[57] ABSTRACT

A control apparatus for a brake system having a housing with a first bore for retaining a spool valve and a second bore for retaining a selector valve. A cap separates the first bore into a first chamber and a second chamber. The first chamber has an inlet port connected to a source of fluid under pressure, a gear port for connected the source of fluid under pressure to a hydraulically operated device, a relief port connected to a reservoir and an outlet passage connected to a selector valve which communicates pressurized fluid through an outlet port to a brake booster. The second chamber is connected to the reservoir and the second bore. The a spool valve has a peripheral surface with first and second grooves separated by lands and an internal operational passage connecting the second groove to the outlet passage. A first return spring positions the spool valve in the first bore such that pressurized fluid is communicated to the hydraulically operated device by way of the inlet port, first groove and gear port. An actuating apparatus has an input piston that is located in the second chamber for receiving an input force of an operator, a plunger which extends through the cap to be partly located in the first and second chambers, a second return spring for urging the input piston toward a rest position and an actuation spring for connecting the input piston with the plunger. An input force moves the input piston in the second chamber to communicate an actuation force to the spool valve by way of the actuation spring and plunger to position the spool valve and restrict communication between the first groove and the gear port and divert operational pressurized fluid to the outlet passage to effect a brake application. The movement of the input piston within the second chamber is modified by communication of fluid therefrom to the selector valve to provide a smooth rate of actuation for the spool valve and to provide a back up source of operational pressurized fluid in the absence of the source of pressurized fluid.

16 Claims, 3 Drawing Sheets

CONTROL APPARATUS FOR A BRAKE BOOSTER

This invention relates to a control apparatus having a resiliently activated spool valve connected to a selector valve for supplying a remotely located brake booster with an input signal or an emergency operational signal to effect a brake application.

BACKGROUND OF THE INVENTION

Hydraulic brake boosters have been designed to provide an assist in the actuation of a master cylinder where a brake force is developed to effect a brake application. In order to reduce the cost of a hydraulic brake booster, often the same hydraulic power source used to supply a steering gear is used to power a hydraulic brake booster. The controls for such hydraulic brake boosters are designed such that a minimum amount of hydraulic fluid is always available for operation of either the hydraulic brake booster or the steering gear. In certain brake boosters of the type disclosed in U.S. Pat. Nos. 3,967,536; 4,131,055; 4,179,980; 4,514,981; 4,724,674 and 5,442,916, the booster operates by restricting flow from one side of a power piston to the other side of the power piston to create a fluid pressure differential which causes a power piston to move and provide power assisted displacement of the pistons in a master cylinder. In this type of brake booster, the master cylinder and booster are joined together and as a result the overall length occupies considerable under hood space of a vehicle. However, because of the efficiency of such brake boosters they have found application in many vehicles and in particular van and certain mid-sized trucks. In recent vehicle models the physical design of the under hood space is often restricted or reduced, and consequently locating a brake booster and other components is often a difficult task. To better utilize under hood space, it has been suggested as in U.S. Pat. Nos. 5,329,769, 5,313,796, 5,709, 438 and U.S. patent application Ser. No. 09/015,166, that certain brake systems components could be located remotely from under the hood. The control valve disclosed in U.S. patent application Ser. No. 09/015,166 functions in an adequate manner, however it is desirable to provide for a more stable or smoother application of the spool valve in the development of pressurized fluid to initiate a brake application.

SUMMARY OF THE INVENTION

A primary object of the present invention is to provide a control apparatus with an actuation arrangement through which an input force is transmitted to a spool valve for developing an operational signal for activating a remotely located brake booster.

According to this invention, the control apparatus has a housing which is fixed to a fire wall of a vehicle and connected to a brake booster which is positioned at some location outside of the space under the hood of a vehicle. The housing for the control apparatus has first and second bores therein with the first chamber being divided into first and second chambers by a cap. The first chamber has an inlet port connected to a source of fluid under pressure, a gear port for connecting the source of fluid under pressure to a hydraulically operated device, a relief port connected to a reservoir and an outlet port connected to the brake booster through the second bore. A spool valve located in the first chamber has a peripheral surface with lands thereon for separating first and second grooves and an internal operational passage connecting said second groove to a reaction chamber. A first return spring positions the spool valve in a rest position such that pressurized fluid is communicated to the hydraulically operated device by way of the inlet port, first groove and gear port. An input force is applied to an actuating arrangement for moving the spool valve within the first bore to an actuating position where communication is restricted between the first groove and gear port to divert operational pressurized fluid to the second groove and ultimately supply a brake booster with an operational signal to effect a brake application. The operational signal passes through the second bore and a selector valve before being presented to the brake booster. The actuation arrangement is characterized by an input piston which is located in the second chamber of the first bore for receiving an input force of an operator, a plunger which is has a head located in the second chamber and a stem which extends into the first chamber for moving the spool valve to an actuating position, and linkage defined by first and second springs for transmitting the input force from the input piston to the plunger. As the input piston moves within the second chamber fluid is expelled through the cap to the second bore. The selector valve in the second bore directs the fluid expelled from the second chamber in a first mode to a reservoir and in a second mode the brake booster as a function of the intensity of fluid pressure supplied to the first bore from the source. In the second mode, the expelled fluid provides for an emergency application of the brake booster to assure that a vehicle is brought and remains in a stationary position.

An advantage of the control apparatus of this invention for a brake system resides in the rate of application of a spool valve to assure a smooth and effective development of a braking signal and wherein an operational signal may be developed in the control apparatus to create a braking signal during an emergency produced by the absence of pressurized fluid from a source.

A further advantage of the control apparatus of this invention in a brake system is provided by a resilient arrangement through which an input force is communicated to a spool valve to develop an operational signal for operating a brake booster.

DETAILED DESCRIPTION

Figure 1:
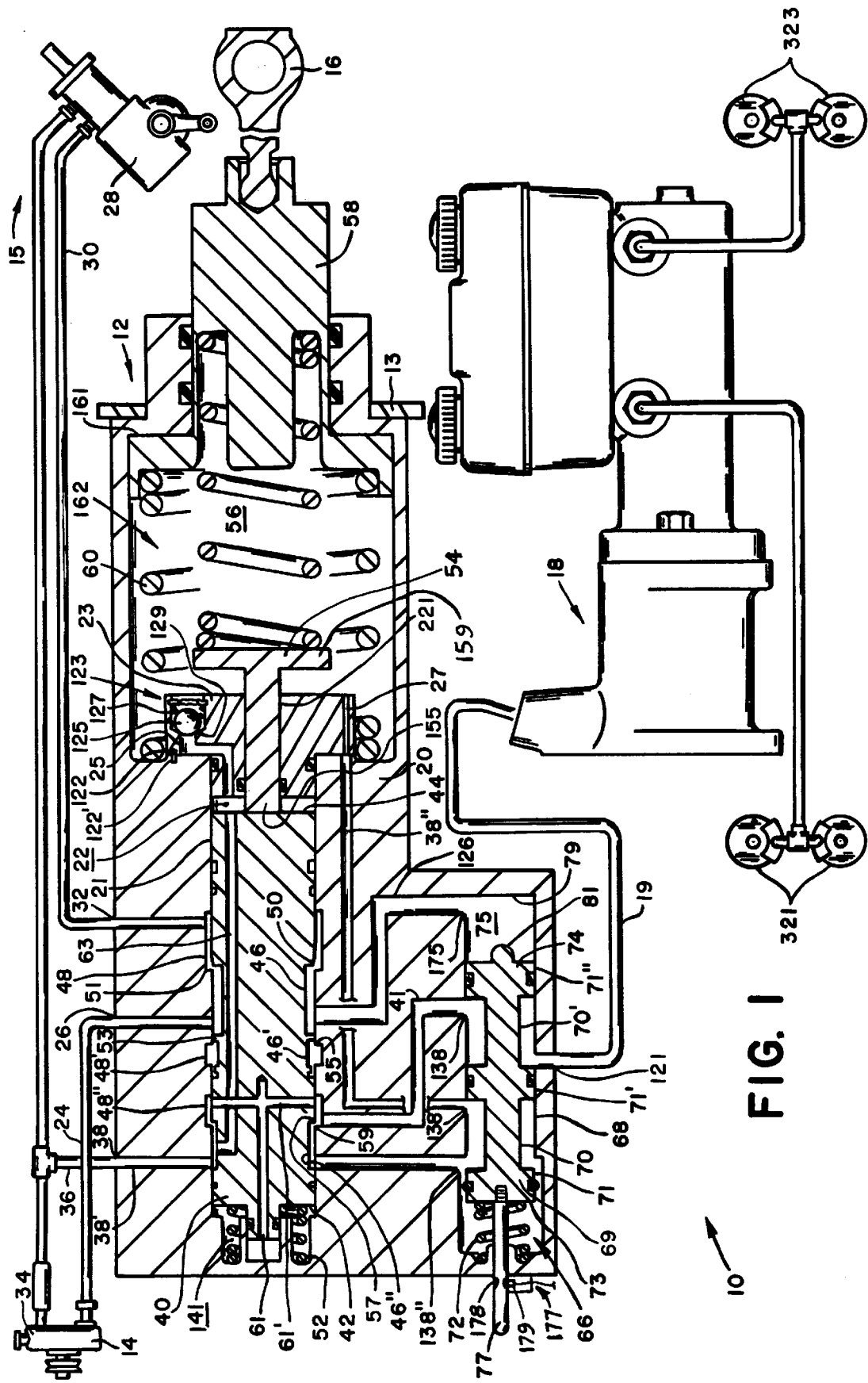
FIG. 1 is a schematic illustration of a brake system which includes a control apparatus made according to the principals of the present invention.

The brake system 10 shown in FIG. 1 includes a control apparatus 12 which is mounted on the fire wall 13 of a vehicle. The control apparatus 12 receives pressurized fluid from pump 14 in the steering system 15 and in response to an input force supplied by an operator through a pedal rod 16 communicates an operational signal to a remotely located brake booster 18 to develop an actuation force to effect a brake application of wheel brakes 221,223 of a vehicle.

The control apparatus 12 has a housing 20 with a first bore 21 and a second bore 68 located therein. The first bore 21 is separated into a first chamber 22 and a second chamber 56 by cap means 23. The first chamber 22 is in communication with pump 14 by conduit 24 connected to inlet port 26, with a steering gear 28 (hydraulically operated device) in the steering system 15 by conduit 30 connected to gear port 32, with a reservoir 34 in pump 14 by a conduit 36 connected to relief port 38 and with the second bore 68 through outlet passage 41 which is connected to brake booster 18 by a conduit 19 which is connected to outlet port 121 for a low flow or selector valve 66.

A spool 40 is located in the first bore 21 has a cylindrical body with a first end 42 and a second end 44. The cylindrical body has a first groove 46, a second groove 46' and a third groove 46" which are aligned with corresponding grooves 48, 48' and 48" in housing 20. A return spring 52 acts on end 42 and urges end 44 into engagement with a stop formed by linkage means 62 connected to pedal rod 16. A first land 50 associated with groove 46 and a first land 51 associated with groove 48; a second land 53 associated with groove 46' and a second land 55 associated with groove 48'; and a third land 57 associated with groove 46" and a third land 59 associated with groove 48" are designed to overlap each other in a radial direction. In a rest position, land 53 engages housing 20 such that fluid under pressure available from inlet port 26 is prevented from being communicated to the second groove 48' to allow unrestricted fluid flow between pump 14 and gear 28. At the same time, lands 57 and 59 are positioned such that free communication occurs between groove 46" and reservoir 34 by way of passage 38' connected to relief port 38. Spool 40 has an operational bore 61 with at least one cross bore 61' which is connected to the third groove 48" in housing 20 and to operational outlet passage 41 connected to the second bore 68. Spool 40 also has a compensation bore 63 which extends from the second end 44 to the third groove 46" such the first chamber 22 is always in communication with reservoir 34 by way of relief passage 38', relief port 38 and conduit 36.

Cap means 23 has a cylindrical body with an axial opening 221, a first passage 25 and a second passage 27. The axial opening 221 has sufficient length to form a bearing surface for stem 155 on plunger 54 of linkage means 162 to avoid binding or offset loading on movement of spool 40 in response to a desired braking input as applied to pedal rod 16. The first passage 25 extends through the cap means 23 in such a manner as to connect chamber 56 with chamber 22 and provide a flow path for fluid from reservoir 34. A check valve 123 located in the first passage 25 has a ball 125 which is urged by a spring 127 against a seat 129 in the cylindrical body. Spring 127 may not be necessary for all applications but is included to assure that fluid communication is limited to one way fluid flow between reservoir 34 chamber 56. The second passage 27 has a predetermined size to define an orifice which restricts or limits communication of fluid out of chamber 56 to a relief passage 38" connected to the second bore 68". The cylindrical body of cap means 23 has a tab or pin 122 which engages a corresponding opening 122' in housing 20 to assure that the second passage 27 is aligned with relief passage 38".

Linkage means 162 in addition to plunger 54 includes a piston 58, a second return spring 60 and an actuation spring 62. The second return spring 60 engages housing 20 and urges piston 58 toward a stop 161 while actuation spring 62 is caged between head 159 on stem 155 and piston 58. Piston 58 moves axially within chamber 56 in response to an input force applied to pedal rod 16 to displace fluid therein to the second bore 68 by way of the restricted second passage 27 in end cap 23 and relief passage 38".

The second bore 68 in housing 20 has a port 175 which receives the same pressurized fluid that bore 21 receives from pump 14 by a passage 126, a control port 138 which is connected by outlet passage 41 to receive operational fluid presented to the third groove 48", an actuation port 138' which is connected to receive fluid discharged from chamber 56 by way of passage 38", and a relief port 138" which is connected to reservoir 34 by way of relief passage 38'. A selector piston 69 located in the second bore 68 has a cylindrical body with a first end 73 and a second end 74. The cylindrical body has a peripheral surface with first 70 and second 70' grooves defined by first 71,71' and 71" lands. The second bore 68 is stepped such that land 71 is normally located in a first diameter section while lands 71' and 71" are always located in and engage a smaller second diameter section. A spring 72 abuts the first end 73 of selector piston 69 and urges the second end 74 toward a pump pressure chamber 75 connected with port 175. An indicator probe 77 attached to end 73 extends through housing 20 to provide a visual indication of the position of selector piston 69 within bore 68. An electrical switch member 177 has a contact 179 which extends into groove 178 in probe to supply computer or other operational control with a signal indicating the position of probe 77 within bore 68.

The selector valve 66 is shown in this embodiment as being located in the second bore 68 of housing 20 for directing operational pressurized fluid present in outlet passage 41 to brake booster 18. However, the operational function of selector valve 66 is independent from the dampening function of the linkage means 162 and could be remotely located in a separate housing.

Mode of Operation of the Invention

When an engine for a vehicle is running, pump 14 is designed to provide pressurized fluid through control apparatus 12 to the steering system 15. In this operating condition, return spring 52 moves spool 40 to a rest position as shown in FIG. 1, and pressurized fluid is freely communicated from pump 14 to steering gear 28 (hydraulically operated device) by way of inlet port 26, the first bore 21, first grooves 46 and 48, gear port 32 and conduit 30. Land 53 is designed to engage bore 21 such that pressurized fluid is prevented from being communicated to groove 48' while pressurized fluid is freely communicated to chamber 75 in the second bore 68. Pressurized fluid in chamber 75 acts on end 74 of selector piston 69 to overcome spring 72 and position land 71' to allow unrestricted communication between groove 48' and brake booster 18 and at the same time land 71 is located in the larger diameter of the second bore 68 so that relief passage 38" is also connected to reservoir 34 by way of actuation port 138', groove 70, relief port 138" and relief passage 38.

Figure 2:
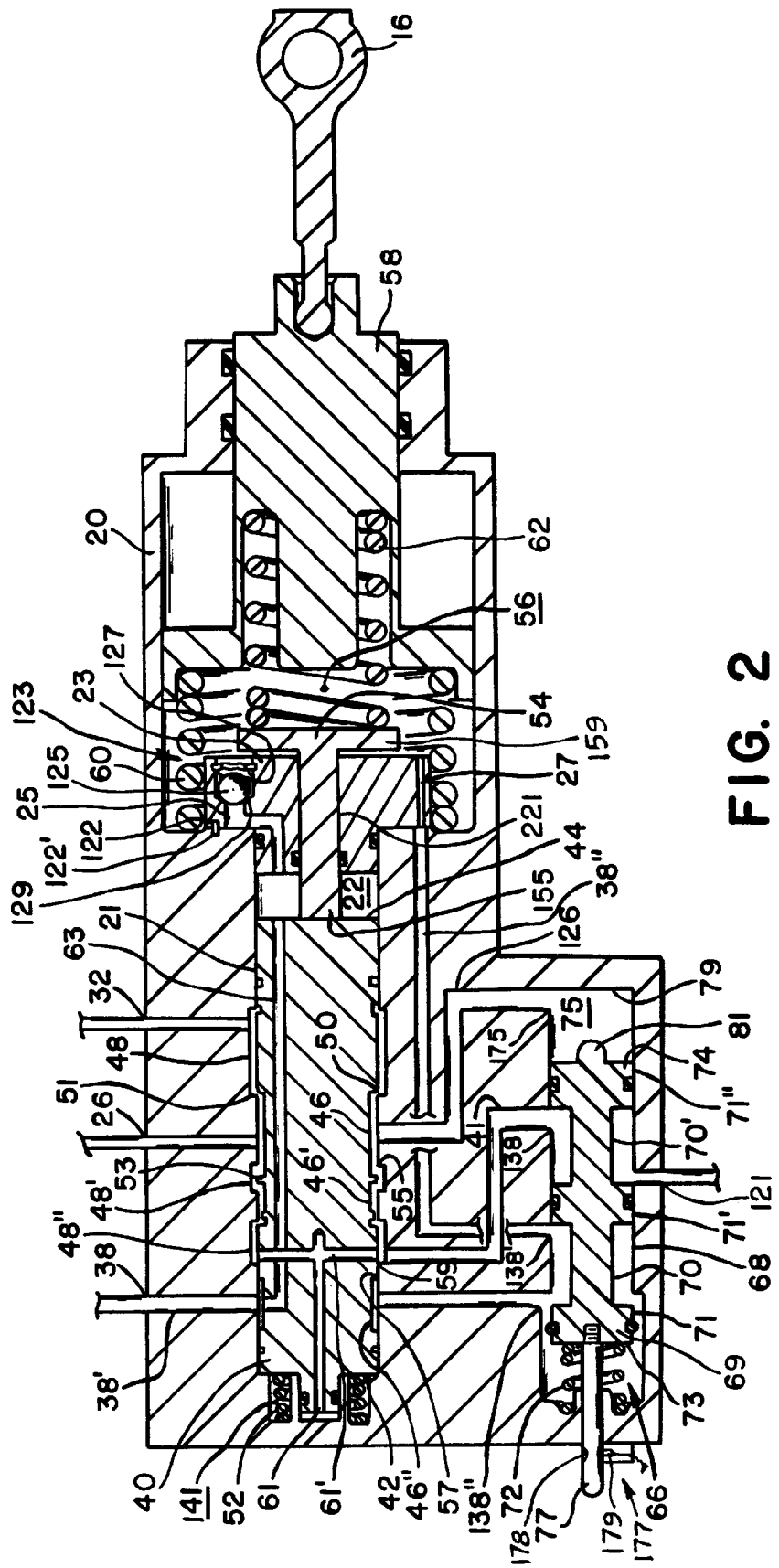
FIG. 2 is a sectional view of the control apparatus of FIG. 1 shown in an actuation position and a selector valve for directing pressurized fluid from a first source to a brake booster.

Should an operator desire to make a brake application, an input force is applied to pedal rod 16 which moves piston 58 into chamber 56 as illustrated in FIG. 2. Movement of piston 58 is communicated through actuation spring 62 to plunger 54 which after overcoming return spring 52 moves spool 40 in bore 21. As spool 40 moves in bore, lands 51 and 53 move toward each other causing a restriction in the flow of pressurized fluid from groove 46 while land 53 moves past land 55 in housing 20 to initially divert pressurized fluid into groove 48' which is later communicated along a flow path to actuation chamber 48" after land 57 laps land 59 in housing 20. The pressurized fluid in actuation chamber 48 is simultaneously communicated to reaction chamber 141 and flow through chamber 75' formed in the second bore 68 for distribution to activate brake booster 18 and effect a brake application of wheel brakes 21 and 23. The pressurized fluid supplied to reaction chamber 141 acts on end 42 of spool 40 to balance the input force applied to end 44 by stem 55 on plunger 54.

Movement of piston 58 in chamber 56 causes a pressure build up of the fluid therein. Since passage 25 is blocked by one way check valve 123, fluid is dispersed from chamber 56 in a controlled manner through restricted passage 27 into relief passage 38 for distribution to reservoir 34 by way of a flow path through the second bore 68 and relief passage 38'. The controlled flow of fluid from chamber 56 provides for a smooth rate of actuation of spool valve 40 as the input force as applied to plunger 54 is modified by both the force of the resilient spring 62 and size of head required to be moved through the fluid. For some applications, the diameter of the head of plunger 54 may be increased or axial holes drilled there through to establish a desired rate of application with an input force. When a desired braking application has been completed, the input force applied to pedal rod 16 is removed and return springs 52 and 60 move spool valve 40 and piston 58 to their positions shown in FIG. 1. As piston 58 moves in chamber 56, a lower pressure develops in the fluid therein causing ball 125 to move away from seat 129 and allow fluid from reservoir 34 to replenish or maintain the fluid in chamber 56 at a desired volume.

Figure 3:
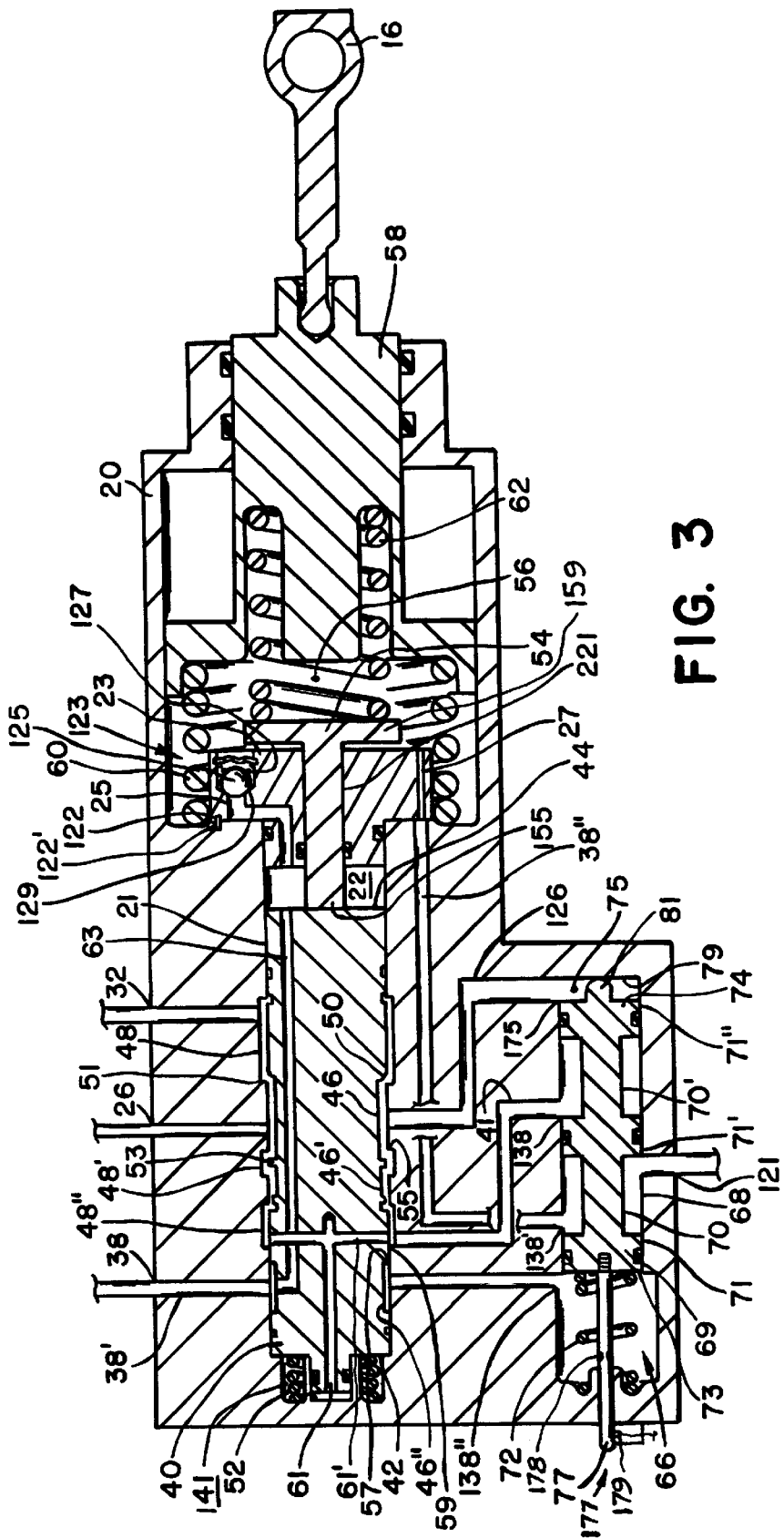
FIG. 3 is a partial sectional view of the control apparatus of FIG. 2 in a actuation position and the selector valve directing pressurized fluid developed within the control apparatus to the brake booster.

In the event that the engine in the vehicle is not operating and pump 14 is not in a backup mode, pressurized fluid would not normally be available for operating steering gear 28. However in this mode of operation of a vehicle it is desirable to have or maintain braking capability. The control apparatus 12 for this mode of operations is illustrated in FIG. 3 wherein spring 72 has shifted selector piston 69 such that land 71 engages the small diameter of bore 68 to block communication from actuator port 138 through groove 70 to outlet conduit and open communication from relief port 138'. In this mode of operation, contact 179 of switch 177 moves out of groove 178 to supply the computer with an indication of the lack of pressurized fluid for operating the brake system. However a manual input is developed in the control apparatus 12 to effect a brake application corresponding to an input force applied to pedal rod 16. The input force moves piston 58 in chamber 56 to displace and pressurize fluid therein supply brake booster 18 with an operational input to effect a brake application. This manual application is possible since the first passage 25 is blocked by one way check valve 123 and as a result pressurized fluid is communicated through restricted passage 27 to relief port 138' by passage 38". However, in this no power or low available pressure condition, spring 72 has moved piston 69 such that relief port 138" is blocked by land 71 engaging the smaller diameter of bore 68 in housing 20 and the pressurized fluid communicated to relief port 138' is communicated to brake booster 18 by groove 70 and outlet port 141 to effect a brake application.

In this no power mode of operation, it is possible to increase the level of the pressurized fluid supplied to brake booster 18 by rapidly moving or pumping piston 58 in chamber 56 as fluid from reservoir 34 is drawn into chamber 56 and the only way out is by flowing through restricted passage 27 to the brake booster 18. The resulting brake application should be sufficient to provide for emergency braking of the vehicle. The pressurized fluid will be retained in the brake booster 18 until pressurized fluid is again communicated to chamber 75 as spring 72 holds projection 81 against stop 79 formed by housing 20 at the bottom of bore 68. Should it be necessary to move a vehicle when this emergency braking operation is effected, indicator probe 77 is pulled to compress spring 72 and dump pressurized fluid supplied to brake booster to effect the brake application by opening a flow path by way of outlet passage 41, groove 48", groove 46" and relief passage 38 connected to reservoir through conduit 36. When pressurize fluid is again developed by way of pump 14, this pressurized fluid will be communicated to chamber 175 and used to develop a force which overcomes spring 72 to move selector piston 69 such that land 71 moves into the large diameter of bore 68 to open groove 70 to relief passage 38 while outlet passage 41 provides a flow path for fluid from brake booster 18 to grove 48" and groove 46" connected to relief passage 38 which in turn is connected to reservoir 34. The vehicle can be moved and when a destination is reached, pressurized fluid again developed by pumping the pedal rod 16 as described above to produce an emergency braking force to hold a vehicle in a stationary location.

We claim:

1. A control apparatus for a brake system, said control apparatus comprising: a housing with a stepped bore therein; divider means for separating said stepped bore into a first chamber and a second chamber, said first chamber being connected with a source of fluid under pressure through an inlet port, a hydraulically operated device through a gear port, a reservoir through a relief port and a brake booster through an outlet port, said second chamber being connected to said reservoir; spool means located in said first chamber and having a peripheral surface with first and second grooves separated by lands and a operational bore, said operational bore being connected to said second groove by at least one radial passage and to said outlet port; cap means secured to said housing for sealing said stepped bore; first return spring means for positioning said spool valve within said first chamber such that pressurized fluid is communicated to said hydraulically operated device by way of said inlet port, first groove and said gear port; and actuation means located in said second chamber for moving said spool valve to restrict communication between said first groove and said gear port and divert pressurized fluid to said outlet port by way of said operational bore to effect a brake application, said actuation means being characterized by an input piston positioned in said second chamber by second return spring means and a plunger located in said second chamber, said plunger being connected to said input piston by an actuation spring, said input piston responding to an input force after overcoming said second return spring means by moving to allow said actuation spring to provide said plunger with a corresponding input force to move said spool valve and divert pressurized fluid to said operational bore to effect a brake application, said input piston movement being modified as a function of restricted fluid flow from said second chamber to limit the application of said input force from said plunger to said spool valve.

2. A control apparatus for a brake system, said control apparatus comprising:
   a housing;
   first and second chambers located in said housing, said first chamber having an inlet port connected to a source of fluid under pressure, a gear port for connected said source of fluid under pressure to a hydraulically operated device, a relief port connected to a reservoir and an outlet port connected to a brake booster, said second chamber being connected to said reservoir;
   a spool valve located in said housing and having a peripheral surface with first and second grooves separated by lands and an internal operational passage connecting said second groove with a reaction chamber;

first return spring means for positioning said spool valve such that pressurized fluid is communicated to said hydraulically operated device by way of said inlet port, first groove and said gear port; and actuating means for moving said spool valve to an actuating position to restrict communication between said first groove and said gear port and divert operational pressurized fluid to said outlet port by way of said second groove to effect a brake application, said actuation means being characterized by an input piston located in said second chamber for receiving an input force of an operator; a plunger partly located in said second chamber and partly located in said first chamber for moving said spool valve to said actuating position; and linkage means for transmitting said input force from said input piston to said plunger.

3. The control apparatus as recited in claim 2 wherein said linkage means comprises a resilient arrangement having a first member located between said housing and said input piston and a second member located between said input piston and said plunger.

4. The control apparatus as recited in claim 3 wherein said first and second chambers are separated by a cap which engages said housing.

5. The control apparatus as recited in claim 4 wherein cap has an axial opening for receiving said plunger.

6. The control apparatus as recited in claim 5 wherein said cap has a first passage for connecting said second chamber with said reservoir and a second passage for connecting said second chamber with a flow switch.

7. The control apparatus as recited in claim 6 wherein said flow switch includes a selector valve connected to receive pressurized fluid from said source, operational pressurized fluid from said outlet port, fluid from said second chamber by way of said second passage and fluid from said reservoir, said selector valve having a first mode of operation wherein said operational pressurized fluid is directed to provide a first operational signal to effect a brake application and in a second mode of operation where fluid pressurized by rapidly moving said input piston in said second chamber is directed to provide a second mode of operation to effect a brake application.

8. The control apparatus as recited in claim 7 wherein said selector valve, in the absence of pressurized fluid from said source, is positioned within said flow switch by a spring to switch from said first mode of operation to said second mode of operation.

9. The control apparatus as recited in claim 8 wherein said housing includes first and second bores for respectively retaining said spool valve and selector valves, said selector valve having an indicator to provide a visual indication of said first and second mode of operation.

10. The control apparatus as recited in claim 9 wherein said selector valve includes:

a control piston having first and second grooves separated by first, second and third lands; and a spring located in said second bore for urging said control piston toward a position associated with said second mode of operation, said pressurized fluid from said source acting on said control piston to overcome said spring and position said control piston in said first mode of operation.

11. The control apparatus as recited in claim 10 wherein said second and third lands on said control piston in said first mode of operation engage said second bore while in said second mode of operation said first, second and third lands engage said second bore.

12. The control apparatus as recited in claim 7 further including:

a check valve located in said first passage to allow fluid to be drawn from said reservoir to maintain a desired fluid level in said second chamber on termination of said input force applied to said input piston.

13. The control apparatus as recited in claim 7 wherein said second passages is sized to restrict fluid flow from said second chamber to provide a controlled rate of application for moving said spool valve to an actuation position.

14. The control apparatus as recited in claim 6 wherein said cap includes alignment means to position said first and second passages within said housing.

15. The control apparatus as recited in claim 11 further including:

indicator means for providing an indication of the position of said control piston within said second bore.

16. The control apparatus as recited in claim 15 further including:

means for moving said control piston to release any operational fluid supplied to said brake booster during the second mode of operation.

* * * * *